(No Model.)

F. GRINNELL.
Automatic Fire Extinguisher.

No. 231,713. Patented Aug. 31, 1880.

WITNESSES:
J. A. Miller Jr.
Wm. L. Coop.

INVENTOR:
Frederick Grinnell
by Joseph A. Miller
Atty

UNITED STATES PATENT OFFICE.

FREDERICK GRINNELL, OF PROVIDENCE, RHODE ISLAND.

AUTOMATIC FIRE-EXTINGUISHER.

SPECIFICATION forming part of Letters Patent No. 231,713, dated August 31, 1880.

Application filed May 31, 1880. (No model.)

*To all whom it may concern:*

Be it known that I, FREDERICK GRINNELL, of the city and county of Providence, and State of Rhode Island, have invented a new and useful Improvement in Automatic Fire-Extinguishers, (Case D;) and I hereby declare that the following is a full, clear, and exact description of the same, reference being had to the accompanying drawings, forming part of this specification.

This invention has reference to improvements in pails or other portable vessels, which may be readily placed in a room or compartment, and provided with devices which will be automatically released by a rise in temperature above the normal temperature and discharge the contents into the room or compartment, so as to extinguish a fire.

The object of this invention is to protect a room or compartment against accidental fire.

The invention consists in providing a portable vessel with a device secured by a solder fusible at a low temperature, so as to be released and allow the contents of the vessel to be discharged when the temperature of the room is raised by a fire, as will be more fully set forth hereinafter.

Figure 1:
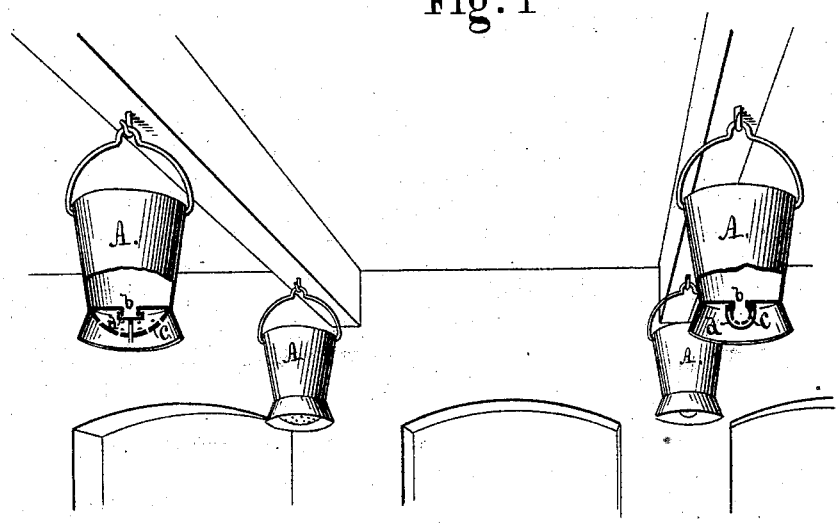
Figure 2:
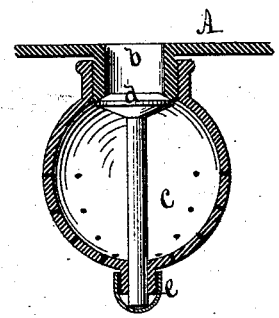
Figure 3:
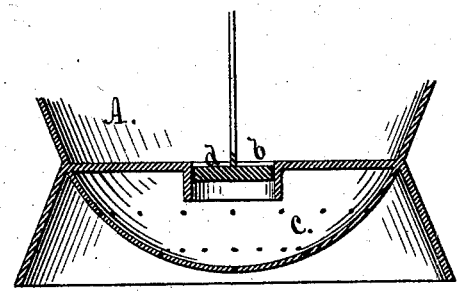

Figure 1 is a perspective view, showing the interior of a room in which portable vessels are suspended. Two of the vessels are shown partly in section. Fig. 2 is an enlarged view of a distributer secured to a portable vessel, and provided with a valve which is held against its seat by fusible solder. Fig. 3 represents the bottom of a portable vessel provided with a perforated distributer and an aperture within which a disk is secured by fusible solder.

In the drawings, A represents a portable vessel, which may be the ordinary bucket, a closed vessel, a portable chemical fire-extinguisher, or any other vessel that may be suspended in a room without being a fixture, connected with a water-supply, and which can be moved from place to place. *b* is an aperture in the bottom of the vessel A, which aperture is sealed up by a device secured by fusible solder. *c* is a perforated distributer arranged to spread the water or other contents of the vessel. *d* represents the seal.

In the vessel shown on the left side of Fig. 1 the seal consists of a cap secured by solder to the bottom of the vessel within the distributer; and in the vessel on the right side of Fig. 1 the seal consists of a cap covering the perforated distributer, and secured to its base or to the bottom by a solder fusible at a low temperature.

In Fig. 2 the seal consists of a valve placed within the distributer, the stem being held by a cap, *e*, secured to the distributer by fusible solder; and the seal in Fig. 3 is a disk secured by fusible solder within the opening in the bottom.

Other devices than those shown and described may be used to release the water or other fire-extinguishing agent contained in the vessel.

When a fire breaks out in a room or compartment in which the vessels are placed and the heat melts the solder, the water or other liquid will be at once discharged, and as the vessel over the fire will be affected first by the heat, the discharge of the contents of the vessel will, in most cases, extinguish the fire.

Any room, no matter how situated, can be protected against fire by means of vessels provided with devices which will release the contents when a fire breaks out, and in some cases such vessels may be of considerable size, when the material to be protected will require a larger quantity of water, or when closed vessels are used in which the water is impregnated with carbonic acid the seal may be connected with a device by which the sulphuric or other acid is released, so as to mix with an aqueous solution of carbonate of soda, and the combined mixture discharged on the fire.

Having thus described my invention, I claim as new and desire to secure by Letters Patent—

1. A portable vessel provided with a device secured by solder fusible at a low temperature, and a distributer arranged to discharge the contents of the vessel when the temperature is raised to the melting-point of the solder, as described.

2. The combination, with the vessel A, provided with an opening, *b*, of the perforated distributer *c*, and the seal or valve *d*, held in place by solder fusible at a low temperature, and arranged to automatically discharge the contents of the vessel when the temperature of the apartment in which the vessel is placed reaches the fusing-point of the solder, substantially as set forth.

FREDERICK GRINNELL.

Witnesses:
JOSEPH A. MILLER,
J. A. MILLER, Jr.